Sept. 18, 1973   YASUHIRO OSHIMA   3,759,769
METHOD OF PRODUCING PLASTIC RESIN LAWN-LIKE
OBJECTS BY ENGRAVED PLATE MOLDING
Filed Dec. 28, 1970   3 Sheets-Sheet 1
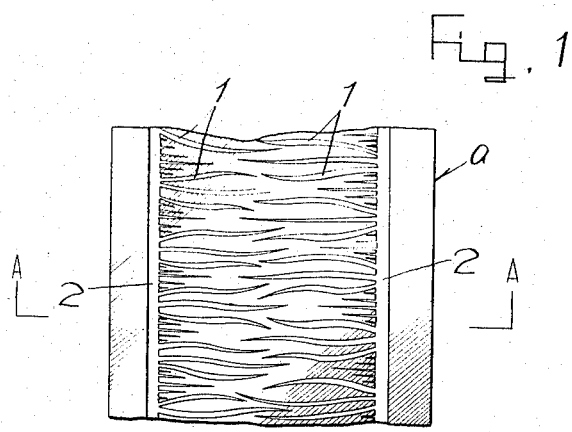
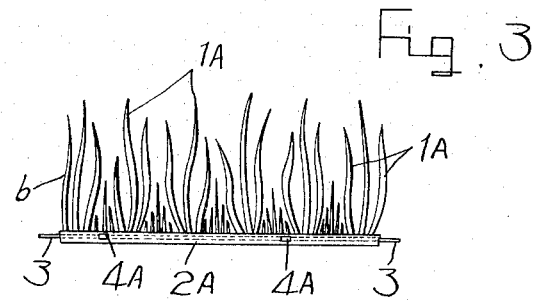
INVENTOR
YASUHIRO OSHIMA
BY

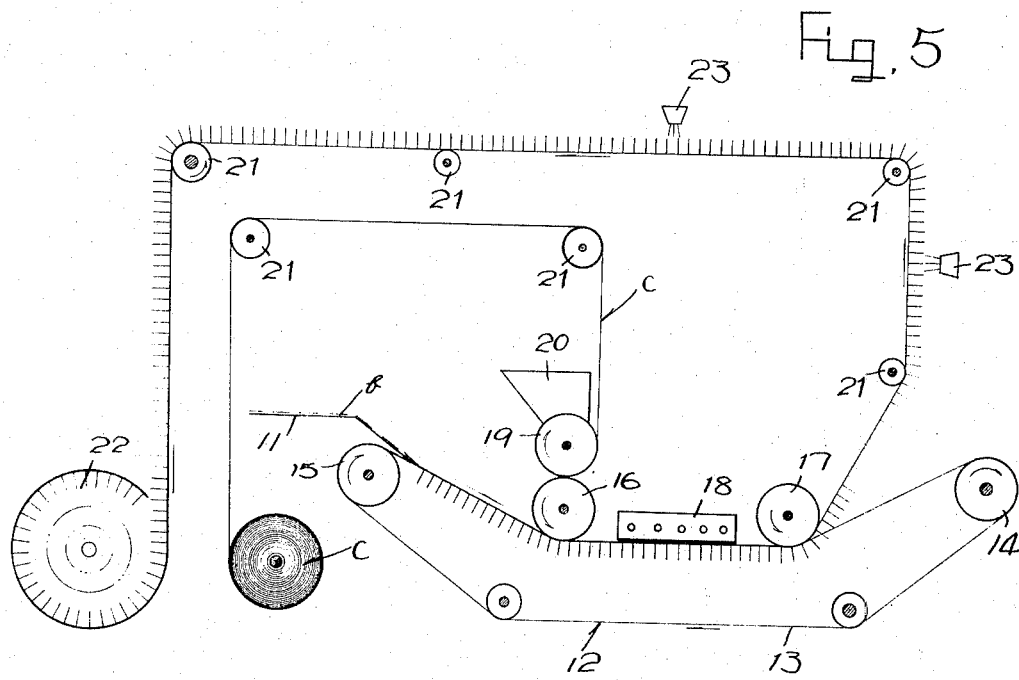

United States Patent Office 3,759,769
Patented Sept. 18, 1973

3,759,769
METHOD OF PRODUCING PLASTIC RESIN LAWN-LIKE OBJECTS BY ENGRAVED PLATE MOLDING
Yasuhiro Oshima, % Meiwa Gravure Chemical Co., Ltd., 860 Kashida, Higashi Osaka, Osaka, Japan
Filed Dec. 28, 1970, Ser. No. 101,480
Claims priority, application Japan, Oct. 6, 1970, 45/88,006
Int. Cl. A41g 1/00; B29c 3/02
U.S. Cl. 156—61                            1 Claim

ABSTRACT OF THE DISCLOSURE

A method of easily and economically mass-producing plastic lawn-like objects exactly like natural lawn, any other grass similar thereto, or the man-created imitations thereof is described. The method involves forming molding plates respectively having a surface continuously engraved with the design of one side of natural lawn or the like. The method further involves filling a plastic resin in this engraved surface, hardening the same to mold lawn-like object constituting elements, and arranging these in a line so as to be stuck inseparably to a ground sheet thereby providing plastic lawn-like objects superior in quality to conventional ones.

---

The present invention relates to an improved method of producing artificial lawn-like objects or the like of synthetic resin material and more particularly it relates to a method of mass-producing such products that are superior in quality and low in cost.

It is one of the main objectives of the invention to provide an improved method of producing such aforementioned synthetic resin lawn-like objects or the like. It is another objective to provide a method of continuously producing a plurality of synthetic resin lawn-like objects or the like having a design on one side of natural lawn or the like by forming a plurality of similar flat molding plates or rotary cylinders respectively having a surface continuously engraved with a preferred design having the exact same outer appearance as that of one side of natural lawn or the like; a plastic resin being filled in the engraved portion of said surface, thereafter solidifying the plastic as it remains filled therein. Further it is another objective to provide a method of economically mass-producing the products in which each constituent element of the plastic resin lawn-like objects or the like is integrated to a ground base or backing sheet. It is also another objective to provide a method of disposing each pair of constituent elements together facing in opposite direction so that they can present a continuity of the above-mentioned design on both surfaces of the products and symmetrically thereof.

Referring to the conventional method for producing artificial lawn-like objects or the like of plastic resin material it is customary to weave either synthetic resin split yarns or monofilaments, in place of twisted yarns, such as by means of a carpet weaving machine, to form the constituent elements of lawn-like objects by using an injection molding machine or otherwise to mold the same under pressure given by a pressure molding machine. However, the artificial lawn-like objects produced in any of these methods are commonly so devoid of any resemblance in appearance to natural lawn or the like that they are seen to be a merely man-created imitation, resulting in decreased consumer interest. What is worse, the manufacturing proces is extremely complicated and very low in productivity thereby giving rise to a prohibited cost of the products.

The present invention has succeeded in elminating the above-mentioned deficiencies of the anticipating arts by using said flat molding plates or rotary cylinders respectively having a surface continuously engraved with a preferred design identical to the outer apperance of natural lawn, any other similar grass or the man-created imitations thereof, and also by using a particular device which will be referred to later.

Figure 2:
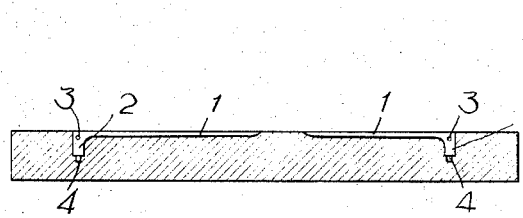
Figure 4:
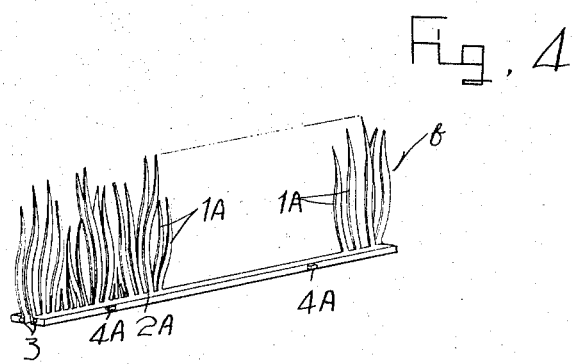

The details of the invention are as described by reference to the accompanying drawings, and in which:

FIG. 1 is a plan view partially showing one of the flat molding plates respectively having a surface engraved with a design appearing the same as one side of natural lawn, FIG. 2 is a vertical section view taken on the line A—A thereof, FIG. 3 is a cross section view of said constituent elements of lawn-like objects (in which a string is shown as being substantially a little more extended than what it really is, said string being set forth hereinafter), FIG. 4 is a perspective view partially showing a pair of constituent elements combined back to back or an unfinished product.

FIG. 5 is a schematic diagram explaining an example showing a particular device to be used for sticking a plurality of paralleled constituent elements inseparably to a ground sheet. In FIGS. 1 and 2 of the accompanying drawings, reference charcater (a) designates a flat molding plate having a surface engraved with designs 1 closely resembling in configuration one side of natural lawn or any other similar grass, said designs having their respective edge provided with a straight groove 2 thereby to be kept in continued relation with respect to adjacent designs. As shown in the drawing, the grass lengths are varied and one side has a surface similar to natural grass with the exposed side of the mold being smooth (see FIG. 2). The blades of grass 1A are depicted in FIGS. 1 and 3 to be substantially perpendicular to base 2.

In this embodiment there are shown said engraved designs 1 and said straight grooves 2 respectively arranged in a double line longitudinally thereof so as to require the minimum quantity of plastic resin material to be molded in said flat molding plate (a) and consequently serve to increase productivity.

On the other hand, there is prepared a thermoplastic resin paste to provide a binding agent comprising for example, a polyvinyl chloride resin dyed in any similar colour to those of natural lawn or any other resembling grass so that the engraved designs 1 and the straight grooves 2 are filled with said paste by means of a doctor or suitable pouring or injector means. In this case, if a string 3 (see FIG. 3) is embedded in the straight groove portion 2, it will serve for a satisfactory process of manufacture. Normally said string 3 is provided by a continuity of thermoplastic resin monofilament, synthetic fibre or the like.

After said thermoplastic resin paste has been filled into mold 2, it is heated to be gelatinized in the manner that will be referred to later. By so doing there is obtainable (see FIG. 3) either a short piece of lawn-like object (comprising blades 1A, string 3, solid base portions 2A and protrusions 4A) for example about 95 cm. in length having one side thereof provided with a design formed in said engraved flat molding plate or a longer piece of lawn-like object having one side thereof provided with a design formed in the engraved rotary cylinder rotatably mounted. Thus in addition to said shorter piece of lawn-like object, said longer piece may be cut into a desired length, namely at the intervals of about 95 cm. thereby obtaining artificial lawn-like objects having a suitably uniform length.

The side view of a portion of said lawn-like object thus produced is shown in FIG. 3 (in which, however, the string 3 is shown a little more extended than what it really is only for more definite display). Reference numeral 4A indicated at in each embodiment of FIGS. 3 and 4 is a protrusion which may be provided as desired and formed integrally with the constituent elements of the lawn-like objects by use of the plastic resin paste previously filled in said engraved flat molding plates (a) (of FIGS. 1 and 2). As shown in FIGS. 2, 3, 4, the protrusions 4, 4A extend from base 2 in substantially perpendicular directions thereto.

In the second place, a plurality of lawn-like objects thus produced are drawn up in a line and inseparably stuck to a ground sheet to be described hereinafter, or each pair of such lawn-like objects are arranged back to back with each other in a row so as to form so-called unfinished products (b) or lawn-like object constituting elements which are partially shown in FIG. 4. In other words, said unfinished products (b) having one side thereof similar to the outer appearance of natural lawn and being arranged back to back in a row, are similar to natural lawn in all directions thereby presenting the appearence of natural lawn planted on land in continuation. Then the unfinished products (b) are inseparably stuck to said ground sheet at right angles therewith, which sticking will be set forth in detail with reference to one of the embodiments as in FIG. 5.

Designated at reference numeral 11 in FIG. 5 is a stand provided in the manner that the unfinished products (b) are held thereon and fed therefrom progressively by their gravity or at regular intervals by a particular device to a pre-determined portion or area of the belt 12 of an operating endless belt conveyor. Said belt 12 comprises for example a plurality of wires 13 respectively about 0.5 mm. in diameter and extended at regularly spaced apart intervals of about 50 mm. between rollers 14 and 15 at least either of which is adapted to drive itself.

Said endless belt 12 is preferably mounted in such an inclined position as is shown herein for the reason that will be explained later. Because of the aforesaid inclination of the wires 13 forming said endless belt 12 and the gravity of the unfinished products (b), the unfinished products on the inclined portion of the endless belt 12 are made to change their position in the manner that the ground sheet to which they are stuck is placed in the upper position while the constituent elements are placed in the lower position so that they are further conveyed in the direction of the arrow shown in the present embodiment while being suspended on said plurality of wires 13. In this case, a plurality of protrusions 4 having a uniform length and formed on one side of the unfinished products (b) serve to keep the unfinished products in a regularly spaced apart relation with each other so that the latter (b) are neatly arranged in a line along each distance interspacing between said wires 13 and further conveyed for the following processes.

As has been described, each root portion of the lawn-like objects constituting elements is embedded with a continuity of string 3, and is effectively reinforced when filled with said plastic resin. Over said endless belt conveyor there is provided a pasting roll 16 preferably of rubber material which is to apply said plastic resin paste or binding agent to the ground sheet and normally in contact with a portion of the belt 12, and further there is provided a roll 17 preferably of rubber material which is suitably spaced away from said pasting roll 16 and mounted rotatably in the forward travelling direction of the belt 12.

Between these rolls 16 and 17 is installed the heater 18 to be described hereinafter. Rotatably mounted over said pasting roll 16 is a paste or binding agent guide roll 19 which has a surface portion normally in contact with a corresponding surface portion of the pasting roll 16. Above said paste guide roll 19 there is mounted a hopper means 20 for supplying the paste or binding agent of plastic resin material. Therefore, said paste or binding agent from the hopper means 20 is supplied under the guidance of the paste or binding agent guide roll 19 to the pasting roll 16.

In FIG. 5 of the drawing, reference character (c) designates a ground sheet composed of one of optional materials such as for example a polyvinyl chloride resin sheet, a mesh-netting cloth, wire netting and the like. The surface of the ground sheet (c) is preferably previously coated with a thermoplastic resin solution. Being prepared in the above-mentioned manner, the ground sheet (c) is rolled out to be supplied through guide rolls 21 between said paste or binding agent guide roll 19 and said pasting roll 16. Thus by means of the roll 16 the plastic resin paste or binding agent is applied all over to one surface of the supplied ground sheet (c) whereby said root portions of the lawn-like object constituting elements conveyed continuously by the endless conveyor belt 12 is automatically stuck to the ground sheet (c) in orderly and inseparable relation with each other. In other words, each of said elements placed in the upper position as has been mentioned is stuck integrally to the paste-applied surface of the ground sheet (c) under the pressure acting between the roll 16 and said plurality of wires 13 forming the endless conveyor belt 12, with the result that they look as if they were well-shaped lawn of wild growth or natural lawn raised or planted on cultivated land.

The ground sheet (c) thus stuck to the unfinished products (b) is further conveyed to the heater 18 in the direction of the roll 17 and, while passing near the heater, it is heated to be dried up. In the test of the present invention, said ground sheet (c) was heated by an infrared gas burner at the temperature of 180° C. for three minutes or 200° C. for one minute when it was being conveyed 5 to 10 cm. away from the burner at the average speed of five meters per minute, and the result was that said plastic resin paste or binding agent was very effectively changed from a fluid into a gel, finally being incorporated with the ground sheet (c).

After this heat treatment, the ground sheet (c) is conveyed through guide rolls 21 to be cooled off by means of a cooling device 23 provided between the guide rolls 21 and a winder 22, thereafter being rolled up by this winder. In this case, if the rotatable roll 17 is adapted to work as a roll of water-cooled type, it is possible to advantageously secure a very high cooling effect by cooling off the ground sheet from the back thereof normally at the temperature of less than 20° C.

In the preceding embodiment, said thermoplastic resin paste has been referred to as an applicable binding agent, but it is to be noted that this is not the only one binding agent since any other kinds of binding agent may be used as long as they can inseparably stick said lawn-like object constituting elements to the ground sheet (c). Furthermore, in place of utilizing said heater 18 or infrared gas burner, a particular cooling device may be independently employed for the purpose of urging a binding agent to be up in a shorter space of time.

In case a thermoplastic resin in general is substituted for the above-mentioned thermoplastic resin paste, a molten mass of the former is extruded from an extruder into the engraved surface of said flat molding plate (a) and cooled off in either method described hereinbefore after surplus quantity thereof has been removed by said doctor or other suitable apparatus, or otherwise each pair of lawn-like objects previously cooled off are arranged back to back in a row thereby providing objects corresponding to the unfinished products (b). This makes it possible to obtain finished products of substantially greater durability than those produced by use of the aforesaid thermoplastic resin paste. However, in the case of using the thermoplastic resin paste of general type, a high sticking effect of lawn-like objects to the ground sheet can be secured especially by using such a resinous paste for example as a polyethylene resin, a vinyl acetate polyethylene resin, a polypropylene resin or the like.

In the preceding embodiment, reference has been made to the method of using the device of FIG. 5 as one of the examples in which unfinished products (b) can be stuck integrally to the ground sheet. However, it is to be noted that such is not the only one sticking method since various other kinds of sticking methods may be adapted. Accordingly, the present invention provides a method of mass-producing artificial lawn-like objects or any other similar grass-like objects of thermoplastic resin material in an easy manner and at low manufacturing cost.

On the top of that, the products obtained in accordance with the method of this invention are quite different from the conventional ones in that they are exactly the same as natural lawn or other similar grass in respect to configuration, outer appearance, three dimensions, colours and the like. Thus it follows that the present invention has a very high effect to produce the artificial lawn-like object that has so far refused to be a perfect counterpart of natural or spontaneous lawn or the like when conventional methods are used to produce same.

While the foregoing is concerned with the methods of producing artificial lawn-like objects exactly like natural lawn, grass similar thereto or man-created imitations thereof, it is to be understood that the same methods are also applicable to the production of carpets and other kinds of matting.

It is to be understood that the present invention is not altogether limited to the particular embodiments illustrated and described herein but includes such changes and modifications thereof as fall within the scope and spirit of the appended claim.

The embodiments of the invention in which an exclusive property or privilege is claimed are defined as follows:

1. A method of producing artificial grass, comprising the steps of
   (A) forming a flat molding plate with a selected design comprising a plurality of blades of grass having varying lengths and on one side of said blades a surface similar to that of natural grass, a groove designed to serve as a base to selectively interconnect said blades of grass therein, said groove being disposed in said plate at one edge of said blades and substantially perpendicular to said blades of grass, and a plurality of protrusions in said plate extending from said groove and perpendicular thereto;
   (B) placing a fibre in said groove;
   (C) filling said design in said molding plate with a hardenable synthetic resin paste;
   (D) hardening said paste by heat drying to produce units of blades of grass connected by a base of said fibre and resin, said grass having varying lengths and natural grass-like surfaces with said protrusions of said resin extending from said base on the same side as said natural grass-like surfaces;
   (E) removing said units from said molding plate;
   (F) placing a pair of each said unit back to back with said natural grass-like surfaces being exposed thereby to form a grass element;
   (G) disposing a plurality of said grass elements in sequence on a continuous belt comprising wire means at suitably spaced intervals for holding said grass elements with said blades of grass positioned downward and suitably spaced from each other by said protrusions; and
   (H) securely affixing said base of said grass elements to backing material.

References Cited
UNITED STATES PATENTS

| | | | |
|---|---|---|---|
| 2,001,970 | 3/1935 | Mazer | 161—64 X |
| 3,098,262 | 7/1963 | Wisotzky | 264—216 UX |
| 3,390,044 | 6/1968 | Malakoff | 161—21 UX |
| 3,616,104 | 10/1971 | Kuzmick | 161—21 |
| 3,576,698 | 4/1971 | Chidgey et al. | 161—21 |
| 3,157,557 | 11/1964 | Palmer | 161—21 UX |
| 3,351,510 | 11/1967 | Harris | 264—216 X |
| 3,230,134 | 1/1966 | Studer | 264—216 UX |
| 3,190,947 | 6/1965 | Norcross | 264—216 |

WILLIAM D. MARTIN, Primary Examiner

H. J. GWINNELL, Assistant Examiner

U.S. Cl. X.R.

156—245; 161—21, 62, 63, 67; 264—167, 219